Nov. 8, 1966   C. G. F. HONIGH   3,283,476
METHOD OF DRYING GASEOUS CHLORINE
Filed June 2, 1964
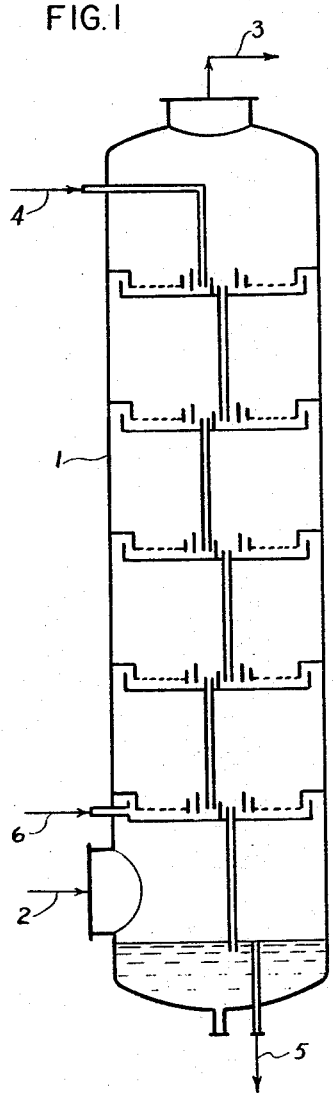
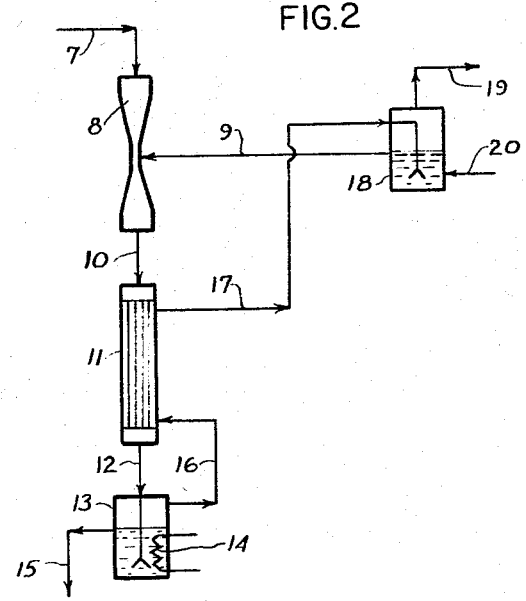
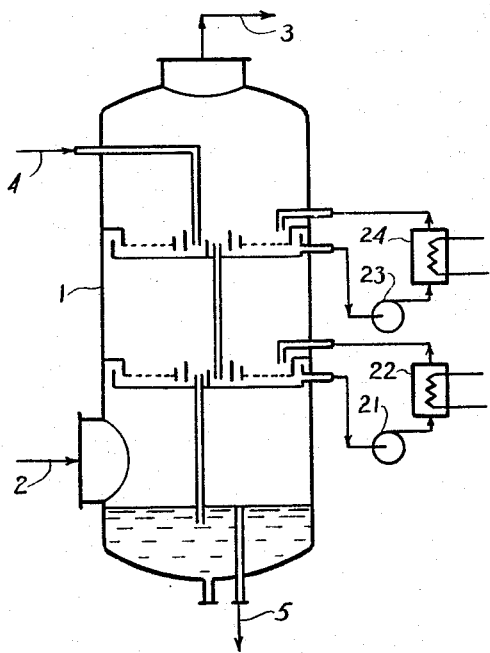

United States Patent Office 3,283,476
Patented Nov. 8, 1966

3,283,476
METHOD OF DRYING GASEOUS CHLORINE
Christiaan Gerard Frederik Honigh, Delden, Netherlands, assignor to N.V. Koninklijke Nederlandsche Zoutindustrie, Hengelo, Netherlands, a corporation of the Netherlands
Filed June 2, 1964, Ser. No. 372,040
3 Claims. (Cl. 55—30)

This invention relates to a method of drying gaseous chlorine. In such method, usually, the gas is cooled and dried with sulfuric acid in a number of steps. The cooling operation preceding the drying proper serves for removing part of the water present in the gaseous chlorine. Usually, this cooling is effected by means of cooling water so that in general the gas temperature is not reduced to below 13 to 15° C. As a matter of fact, in view of the risk of the formation of chlorine hydrate the gas may not be cooled down further than to about +10° C. A disadvantage of the usual drying with sulfuric acid is that even if it is effected in, for instance, five steps, the concentration of the discharged acid still has to be 60 to 70% in order to obtain an effective drying operation. This means that the acid consumption is rather high. Add to this that often it is difficult to find a profitable use for the discharged acid.

It has been proposed to avoid these disadvantages by drying gaseous chlorine only by means of cooling to low temperatures in the presence of hydrogen chloride.

Thereby the formation of chlorine hydrate may be prevented, provided the quantity of hydrogen chloride added be chosen dependent on the amount of water vapour present. A certain contamination of the dried gaseous chlorine with hydrogen chloride can not be avoided in this known process.

The invention aims at obviating the disadvantages of the usual drying operation while retaining the effective and easily operable drying with sulfuric acid, and relates to a method of drying gaseous chlorine wherein the gas is cooled and is dried with sulfuric acid in a number of steps.

In accordance with the invention at least the last part of the cooling operation and the first part of the drying operation are combined in that the temperature of the gaseous chlorine is lowered by artificial cooling in the presence of sulfuric acid.

Due to the invention a considerable reduction of the sulfuric acid consumption can be obtained. If, for example, the gas is cooled to 0° C., which can be effected without the risk of chlorine hydrate formation due to the presence or sulfuric acid, even an as effective drying as in the usual process can be obtained when the amount of concentrated sulfuric acid supplied is reduced to such an extent that the discharged acid has a concentration of about 30%. The saving in the sulfuric acid consumption is then 70 to 80%.

The German specification 744,367 discloses a method of purifying chlorine gas with deep-cooled liquids and mentions that in treating moist chlorine gas and in using concentrated sulfuric acid as the cooling liquid the usual drying operation with uncooled sulfuric acid can be dispensed with. However, in that case the sulfuric acid consumption is very high since the acid has to be discharged with a high concentration so as to avoid the formation of solid sulfuric acid hydrate. Thus, sulfuric acid having a concentration of about 90% by weight already solidifies at the temperature of −11° C. mentioned in the example of the cited specification.

The artificial cooling operation of the gaseous chlorine in the presence of sulfuric acid can advantageously be effected by the evaporation of liquid chlorine, in particular if the drying method is a preliminary step in a chlorine liquefaction process. In this embodiment an indirect heat exchange with the evaporating chlorine may be used but, preferably, liquid chlorine is directly introduced into the first drying step.

However, it is possible to use any other artificial cooling method, that is to say, any other way of cooling wherein by means of released pressure evaporation of a coolant a lower temperature can be reached than usually is the case with the available cooling water.

In a preferred embodiment the sulfuric acid which is in contact with the gaseous chlorine during the cooling operation consists of at least part of the sulfuric acid discharged from a subsequent drying step, but, if desired, one may also use sulfuric acid which has not been withdrawn from a next step.

Care should be taken that where the gas comes into contact with concentrated sulfuric acid the temperature of the gaseous chlorine is higher than the temperature at which solid sulfuric acid hydrate separates from the sulfuric acid. In case the absorption heat liberated in the various drying steps is not sufficient the gaseous chlorine and/or the sulfuric acid with which the gas comes into contact may be heated. In an advantageous embodiment, in the first drying step the temperature of the gaseous chlorine is reduced to a value which is considerably lower than the temperature at which chlorine hydrate is formed from chlorine and pure water under the prevailing pressure, while prior to or during passage to a subsequent drying step the gas is heated to a temperature higher than that at which solid sulfuric acid hydrate can separate from concentrated sulfuric acid. In this way it is possible to cool to a very low temperature in the first drying step without the risk of sulfuric acid hydrate formation in a subsequent step. Thereby, the number of drying steps may be reduced considerably.

In view of the heat economy the method is advantageously effected in such a manner that the temperature of the gaseous chlorine cooled in the first drying step in the presence of sulfuric acid and partially dried in this step and possibly in one or more subsequent steps, is raised by heat exchange with the gaseous chlorine to be cooled artificially before the partially dried gaseous chlorine is passed to the next drying step.

The invention will be described, by way of example, with reference to the drawing which schematically shows three embodiments of an installation adapted for effecting the method according to the invention.

The installation shown in FIG. 1 comprises a drying tower 1 provided with five perforated plates with appertaining collecting cups, overflow pipes etc. for obtaining an effective exchange between the gaseous chlorine passing through the tower from the bottom to the top and the sulfuric acid streaming from the top to the bottom. The gas to be dried is supplied through conduit 2 and the dried gas is discharged through conduit 3. Concentrated sulfuric acid is supplied to the tower through conduit 4 and the acid containing the water removed from the gas is discharged from the tower through conduit 5. Liquid chlorine is added to the sulfuric acid present in the lowermost collecting cup through conduit 6 so as to effect the artificial cooling of the gaseous chlorine in the presence of sulfuric acid.

In the installation according to FIG. 2 the gaseous chlorine to be dried, which may be preliminarily cooled to a temperature not lower than 10° C. and freed from the water condensed thereby, is supplied through conduit 7 which comprises venturi tube 8. Sulfuric acid is supplied to the gas stream through conduit 9 debouching in the restricted portion of tube 8. In the embodiment shown, this acid is the sulfuric acid discharged from a drying step to be described hereinafter.

The sulfuric acid laden gas passes through conduit 10 to heat exchanger 11 and therefrom through conduit 12 to cooling vessel 13 which also serves as a means for separating liquid droplets. Diluted sulfuric acid is contained in vessel 13. The sulfuric acid is cooled with a coolant passed through cooling coil 14. Conduit 12 debouches into vessel 13 below the liquid level defined by overflow conduit 15 for the diluted sulfuric acid.

The gaseous chlorine is discharged from vessel 13 through conduit 16, is passed through heat exchanger 11 and is then introduced into vessel 18 through conduit 17. The gas is discharged from this vessel through conduit 19 as a dried gas.

Concentrated sulfuric acid (or possibly oleum or even only $SO_3$) is supplied to vessel 18 through conduit 20. The acid containing the water removed from the gas is discharged from vessel 18 through overflow conduit 9 debouching into venturi tube 8 mentioned hereinbefore.

In this embodiment venturi tube 8, exchanger 11 and vessel 13 may be considered as the first drying step and also as the last part of the cooling operation, whereas vessel 18 forms the second drying step which is at the same time the last one.

In FIG. 3 it has been schematically shown that in a drying tower of the type illustrated in FIG. 1 cooling can also be effected by discharging sulfuric acid from the lowest collecting cup, cooling it, for example to −30° C., in a circuit comprising a pump 21 and a cooler 22, and then reintroducing it into the tower.

In a subsequent drying step the sulfuric acid can be heated so as to prevent sulfuric acid hydrate from being formed. This has been illustrated in FIG. 3 for the second, at the same time last drying step which is provided with a circuit comprising a pump 23 and a heater 24.

EXAMPLE I

Per hour 2300 kgs. of gaseous chlorine containing about 1.7 mol. percent of water vapour and having a temperature of about 15° C. were supplied through conduit 2 to a drying tower of the type shown in FIG. 1. By supplying 110 kgs. of liquid chlorine through conduit 6 a temperature of about 0° C. was maintained in the lowest drying step. When per hour 4.6 kgs. of sulfuric acid of 96% were supplied through conduit 4 to the upper drying step the dried gas had a moisture content of less than 10 parts per million; the concentration of the acid discharged from conduit 5 was 30%.

In comparison it may be mentioned that without introducing liquid chlorine 20 kgs. of sulfuric acid of 95% per hour had to be supplied to the upper drying step to obtain the same drying effect. Consequently, in this case a saving in sulfuric acid consumption of more than 75% was obtained due to the method according to the invention.

EXAMPLE II

Per hour 400 kgs. of gaseous chlorine containing about 1.7 mol. percent of water vapour and having a temperature of about 15° C. were supplied to an installation according to FIG. 2. The temperature of the sulfuric acid contained in vessel 13 was maintained at −35° C. by means of a coolant. As a result of the absorption and dilution heat liberated by the moist gaseous chlorine coming into contact with the sulfuric acid supplied through conduit 9, the mixture discharged from venturi tube 8 had a temperature of about 35° C. In heat exchanger 11 this temperature was reduced to about −20° C. while the temperature of the gas discharged from vessel 13 and being already substantially dry raised from −35° C. to about +20° C.

At this temperature the gas entered vessel 18 wherein the moisture content was still further reduced by the contact with concentrated sulfuric acid. The discharged gas had a moisture content of less than 10 parts per million. Due to the deep-cooling of vessel 13 this could be attained in two drying steps only. Per hour 800 gs. of sulfuric acid of 96% were supplied through conduit 20. The acid discharged from vessel 13 had a concentration of about 30%.

What is claimed is:

1. A method of drying gaseous chlorine which comprises contacting a stream of wet gaseous chlorine with a stream of sulfuric acid in a first drying step while maintaining a temperature in said step lower than the temperature at which chlorine hydrate is formed from chlorine and pure water under the pressure prevailing in said step, separately discharging gaseous chlorine and sulfuric acid from said first drying step, contacting said first discharged gaseous chlorine with concentrated sulfuric acid in a subsequent drying step while maintaining a temperature in said subsequent step higher than the temperature at which solid sulfuric acid hydrate is capable of separating from concentrated sulfuric acid, and separately discharging gaseous chlorine and sulfuric acid from said subsequent step, at least part of the sulfuric acid discharged from said subsequent drying step being passed to said first drying step for serving therein as the said stream of sulfuric acid with which said stream of wet gaseous chlorine is contacted.

2. The method as defined in claim 1, wherein prior to being introduced into said subsequent drying step the gaseous chlorine discharged from said first drying step is brought into indirect heat exchanging relationship with the stream of wet gaseous chlorine to be introduced into said first step.

3. The method as claimed in claim 1 in which liquid chlorine is introduced in direct contact with said wet gaseous chlorine and with said sulfuric acid in said first drying step to maintain said low temperature in said first drying step.

References Cited by the Examiner
UNITED STATES PATENTS

| | | | |
|---|---|---|---|
| 1,507,289 | 9/1924 | Jewell | 23—219 X |
| 1,791,086 | 2/1931 | Sperr | 55—30 |
| 1,847,845 | 3/1932 | Mullen | 55—29 |
| 2,446,181 | 8/1948 | Kraus | 55—71 |

REUBEN FRIEDMAN, *Primary Examiner.*

R. W. BURKS, *Assistant Examiner.*